US006816589B2

(12) United States Patent
Pinard

(10) Patent No.: US 6,816,589 B2
(45) Date of Patent: Nov. 9, 2004

(54) DYNAMIC COMMUNICATIONS GROUPS

(75) Inventor: Debbie Pinard, Kanata (CA)

(73) Assignee: Mitel Corporation, Kanata (CA)

(*) Notice: Subject to any disclaimer, the term of this patent is extended or adjusted under 35 U.S.C. 154(b) by 0 days.

(21) Appl. No.: 09/137,630

(22) Filed: Aug. 21, 1998

(65) Prior Publication Data

US 2001/0043696 A1 Nov. 22, 2001

Related U.S. Application Data

(60) Provisional application No. 60/056,660, filed on Aug. 22, 1997.

(51) Int. Cl.[7] .............................................. H04M 3/00
(52) U.S. Cl. ............. 379/265.01; 379/156; 379/201.01; 379/220.01
(58) Field of Search ................................ 379/199, 234, 379/334, 201, 207, 96.01, 93.02, 266, 82, 201.01, 201.02, 207.02, 219, 220.01, 221.15, 242, 265.01, 266.01, 156, 157; 709/102–107; 395/60; 706/45, 10, 14

(56) References Cited

U.S. PATENT DOCUMENTS

| 4,259,549 A | * | 3/1981 | Stehman ................. 179/18 ES |
| 5,007,080 A | * | 4/1991 | MacMillan et al. .......... 379/269 |
| 5,206,903 A | | 4/1993 | Kohler et al. .......... 379/265.12 |
| 5,440,541 A | * | 8/1995 | Iida et al. .............. 379/207.12 |
| 5,533,110 A | * | 7/1996 | Pinard et al. .......... 379/201.04 |
| 5,631,954 A | | 5/1997 | Evans et al. ................. 370/271 |
| 5,638,494 A | | 6/1997 | Pinard et al. ............... 709/202 |
| 5,761,288 A | * | 6/1998 | Pinard et al. .......... 379/201.03 |
| 5,768,360 A | * | 6/1998 | Reynolds et al. ........... 379/220 |
| 5,862,325 A | * | 1/1999 | Reed et al. ............ 395/200.31 |
| 6,075,851 A | * | 6/2000 | Pinard et al. ............... 379/199 |
| 6,333,980 B1 | | 12/2001 | Hollatz et al. .......... 379/265.12 |

FOREIGN PATENT DOCUMENTS

| CA | 2108224 | 4/1995 |
| DE | 44 30 344 A1 | 4/1995 |
| DE | 195 36 213 A1 | 4/1996 |
| DE | 196 22 347 A1 | 12/1996 |
| DE | 197 09 214 A1 | 10/1997 |
| EP | 0 795 991 A1 | 3/1996 |

OTHER PUBLICATIONS

Data Systems and Communications Dictionary, 1989, Oscar Brandstetter Verlag.
System HICOM 600, Dec. 12, 1984, Siemens.
Elevator Scheduling System Using Blackboard Architecture, C.I.S.T.I., Nov. 28, 1998, pp. 2–11, Grantham K.H. Pang, BSc, Ph.D.
"Toward a Taxonomy of Multi–agent Systems", Shawn D. Bird, Int. J. Man—Machine Studies (1993) 39, 689–704.
Blackboard Systems: The Blackboard Model of Problem Solving and the Evolution of Blackboard Architectures, H. Penny Nii, The AI Magazine, Summer, 1986.
"An Intelligent Agent Framework for Enterprise Integration", Jeff Y.C. Pan and Jay M. Tenenbaum, IEEE Transactions on Systems, Man, and Cybernetics, vol. 21, No. 6, Nov./Dec. 1991.
"Blackboard Systems" Daniel Corkill, AI Expert, Sep. 1991.

* cited by examiner

*Primary Examiner*—Fan Tsang
*Assistant Examiner*—Ovidio Escalante
(74) *Attorney, Agent, or Firm*—Fay, Sharpe, Fagan, Minnich & McKee, LLP

(57) ABSTRACT

In a communication system, the improvement comprising a plurality of user data files for respective users each user data file including at least one role identifier; a plurality of communication groups having respective group name identifiers for associating predetermined roles with the groups and respective group phone numbers; and a role list data file for automatically associating respective ones of the users with a predetermined one or more of the communication groups according to the at least one role identifier.

6 Claims, 17 Drawing Sheets

HUNT GROUP:

PILOT#: 1234
  HUNT TYPE: CIRCULAR
  MEMBERS: 1693
           1694
           1695

FIG. 8
(PRIOR ART)

HUNT GROUP:
  NUMBER: 1234
  NAME: CUSTOMER SUPPORT
  HUNT TYPE: CIRCULAR
  FEATURE LIST:

FIG. 9a

ROLE LIST:
  CUSTOMER SUPPORT PERSON

FIG. 9b

PERSON:
  NAME : JOHN DOE
  PHONE NUMBER: 1999
  ROLES: CUSTOMER SUPPORT PERSON

FIG. 9c

DYNAMIC COMMUNICATIONS GROUPS

CROSS REFERENCE TO RELATED APPLICATIONS

This application claims the benefit of U.S. Provisional Patent Application Ser. No. 60/056,660, filed Aug. 22, 1997.

FIELD OF THE INVENTION

The present invention relates in general to telephony, and more particularly to an apparatus and method for dynamically allocating telephone and other communications equipment to predetermined groups.

BACKGROUND OF THE INVENTION

It is known in communications systems such as PABXs and key telephone systems to allocate persons having communications equipment, such as telephone sets, to one or more communication groups, such as hunt groups or key line groups, having a common purpose (i.e. each person of the group is equally competent to deal with an incoming call to the group). One common example within large technology companies, is the establishment of customer support groups. Hunt groups may be of a number of types, and are identified by pilot number (the number dialed to obtain the group), hunt type (terminal, circular, or longest idle member) and a list of member extension numbers.

Each time a member is added to or deleted from the group (e.g. due to a role change within the organization), the member list must be manually updated. Also, when a person who is a member of several groups leaves the organization, then each of the hunt groups to which that person belonged must be updated, resulting in considerable replication of work. Finally, in the event that a person is temporarily unable to participate in the group due to illness, travel, etc., there is no mechanism according to the prior art for temporarily removing that person from the group so as not to ring his or her telephone set.

SUMMARY OF THE INVENTION

According to the present invention, an apparatus and method are provided for assigning to each person within an organization at least one role, a plurality of communication groups having respective group name identifiers for associating predetermined roles with the groups and respective group phone numbers, and a role list data file for automatically associating respective ones of the users with a predetermined one or more of the communication groups according to the role identifier for the respective users.

According to the invention, when the role of the user changes, the user's membership in one or more communication groups is automatically updated to take the person out of any groups that he or she is no longer a part of, or to play a unique role within each group to which the user is added.

Therefore, the system of the present invention overcomes tedious manual addition, deletion and revision to communication groups, such as hunt groups and key line groups, as exemplified by the prior art.

BRIEF DESCRIPTION OF THE DRAWINGS

A detailed description of a preferred embodiment of the invention is provided herein below, with reference to the following drawings in which:

FIGS. 1–6 are diagrams showing various basic aspects of the agent architecture used to implement the present invention;

FIG. 5 illustrates a blackboard process;

FIG. 8 shows a hunt group structure according to the prior art;

FIG. 9a shows a hunt group structure according to the present invention;

FIG. 9b shows a role list for adding a person to a hunt group according to the present invention;

FIG. 9c shows a user data file structure according to the present invention;

DETAILED DESCRIPTION OF THE PREFERRED EMBODIMENT

Figure 1A:
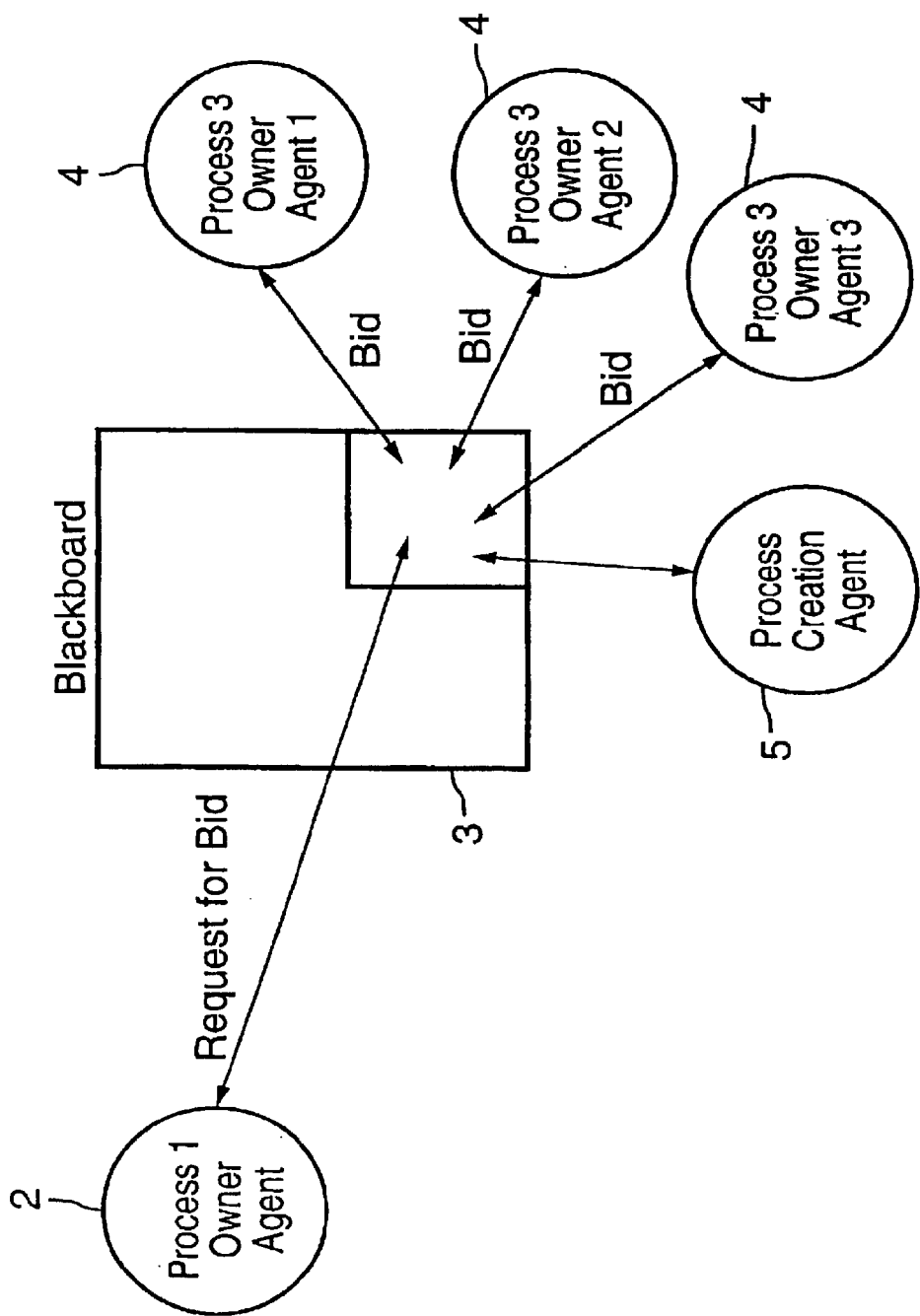
FIG. 1a is a block diagram of a blackboard.

The concept of a general system using agents has been described in the publications "Toward A Taxonomy Of Multi-Agent Systems", Int. J. Man-Machine Studies (1993) 39,689–704, Academic Press Limited, and "An Intelligent Agent Framework For Enterprise Integration" by Jeff Y. C. Pan and Jay M. Tenenbaum, Transactions On Systems, Man, and Cybernetics, Vol. 21, No. 6, November/December 1991 pp 1391–1407, and commonly owned U.S. Pat. No. 5,638,494 and commonly owned U.S. Pat. No. 5,631,954, the contents of which are incorporated herein by reference.

For clarity, subsystems and devices used in the present invention will now be generally described. Processes described herein comprise computer software executed on a processor, which includes any required program and data storage apparatus, such as random access memory.

Devices described herein are persons, software application programs or machines that can perform a task, and are defined by their capabilities and capacities. Devices are owned, and have their capabilities distributed via ownership. A device is limited; external devices are not aware of how tasks are accomplished internally of the device. A device may contain other devices and agents internally, but these internal devices and agents are not visible externally.

An agent is a physical entity, as will be described below in more detail, which can accept a goal or goals, and produce an outcome or series of tasks. That outcome may be another goal or a set of goals. An agent may be the external representation of a device.

An agent only functions for the goals of which it has knowledge. A method for accomplishment of each goal is associated with each goal. These methods may involve planning, within the agent.

An agent may directly represent a device, or work through intermediate agents or devices, but is associated with its intermediary devices through a resource.

An agent sees only the portion of the capabilities of a device or of another agent it is entitled to use, and a technique for using it, which is referred to as representation of the device or of the resource. A resource may consist of the representations of several devices and means for selecting from them. The means for selecting from several devices is referred to as a broker.

A goal is an input to an agent, and specifies a task which an agent is to perform. Each goal is associated with a method for accomplishing the goal, as will be described in more detail in this specification.

The capability of endowing an agent with goals and resources is referred to as jurisdiction. Thus a higher level agent may use a lower level agent over which it has jurisdiction, as part of its goal definition, and thus it may endow the lower level agent with capabilities. A higher level agent with jurisdiction can provide another agent with the lower level agent as a resource.

The rights to use parts of the capability and the capacity of a device is referred to as ownership, and the granting of these rights for a device that is used by another device may only be done through ownership. Ownership may be of several types: constant, statistical, or as available.

Ownership may be devolved through a hierarchy of resources. Devolved ownership carries constraints; a devolved owner may devolve any type of ownership and add constraints, but may not remove constraints placed on a device by a higher level agent. Ownership is also devolved on different time scales. Some higher level agents will require almost permanent ownership of a device, for example a group with rights to a database system. This ownership can be devolved dynamically, such as when a group allocates the rights to a group member for a single transaction.

An allocated device may police its submitted goals to be sure that no other agent is exceeding its ownership rights. However, policing may not be necessary if done informally by policy.

The technique used by a resource to select among devices which can be used to accomplish a goal, is an allocation mechanism. The allocation mechanism is designed locally for the purposes of the resource. Together with the device representations, the allocation mechanism constitutes a broker within the resource. The broker is designed to achieve a purpose local to the resource, e.g. lowest cost, reliability, redundancy, most suitable device, etc. The broker may include a pseudo cost bidding system, or some other suitable mechanism.

An enterprise modeling tool allows an enterprise to be modeled as a hierarchy, a set of processes (which for example may be serial with or without branches), resources (such as a telephone, a computer, a text-to-speech converter, a facsimile machine, a filing cabinet, an individual such as a manager, a software designer, a purchasing agent, etc.), and an activity which utilizes resources.

Some generic processes can be supplied, such as "make a call", which internally can be represented by a series of activities and resources. The present invention takes these data as input and creates the underlying agents needed to run a system.

The present invention does not simulate a system, but is used to define the enterprise itself and to create the agents necessary to perform the actual execution of the defined processes.

An owner agent has the task of mapping a generic process from a system tool onto physical agents. Thus once the tool has defined the generic process needed, an agent is created to contain the physical process. Once it has been created, its task is to obtain and connect physical agents corresponding to the generic agents. In accordance with a preferred embodiment of the invention, it does this using a blackboard system.

Blackboard systems have been described in the publications "Blackboard Systems", by Daniel Corkill, published in Al Expert, September 1991, pp 41–47, "Blackboard Systems: The Blackboard Model of Problem Solving and the Evolution of Blackboard Architectures" by H. Penny Nii, published in The AI Magazine, Summer 1986, pp 38–53, and "Elevator Scheduling System Using Blackboard Architecture", by Grantham K. H. Pang, published in IEE Proceedings-D, Vol. 138, No. 4, July 1991, pp 337–346, which are incorporated herein by reference.

As illustrated in FIG. 1a, an owner agent 2 containing process 1 posts a task to a blackboard (RAM) 3. This is interpreted by other owner agents 4 as a request for bids. Owner agents 4 then post bids to complete the process, in accordance with the resources over which they have jurisdiction, and the economics of the completion of the task. In the present invention, the agents have particular design, for example containing brokers, as will be described in more detail below.

Figure 1B:
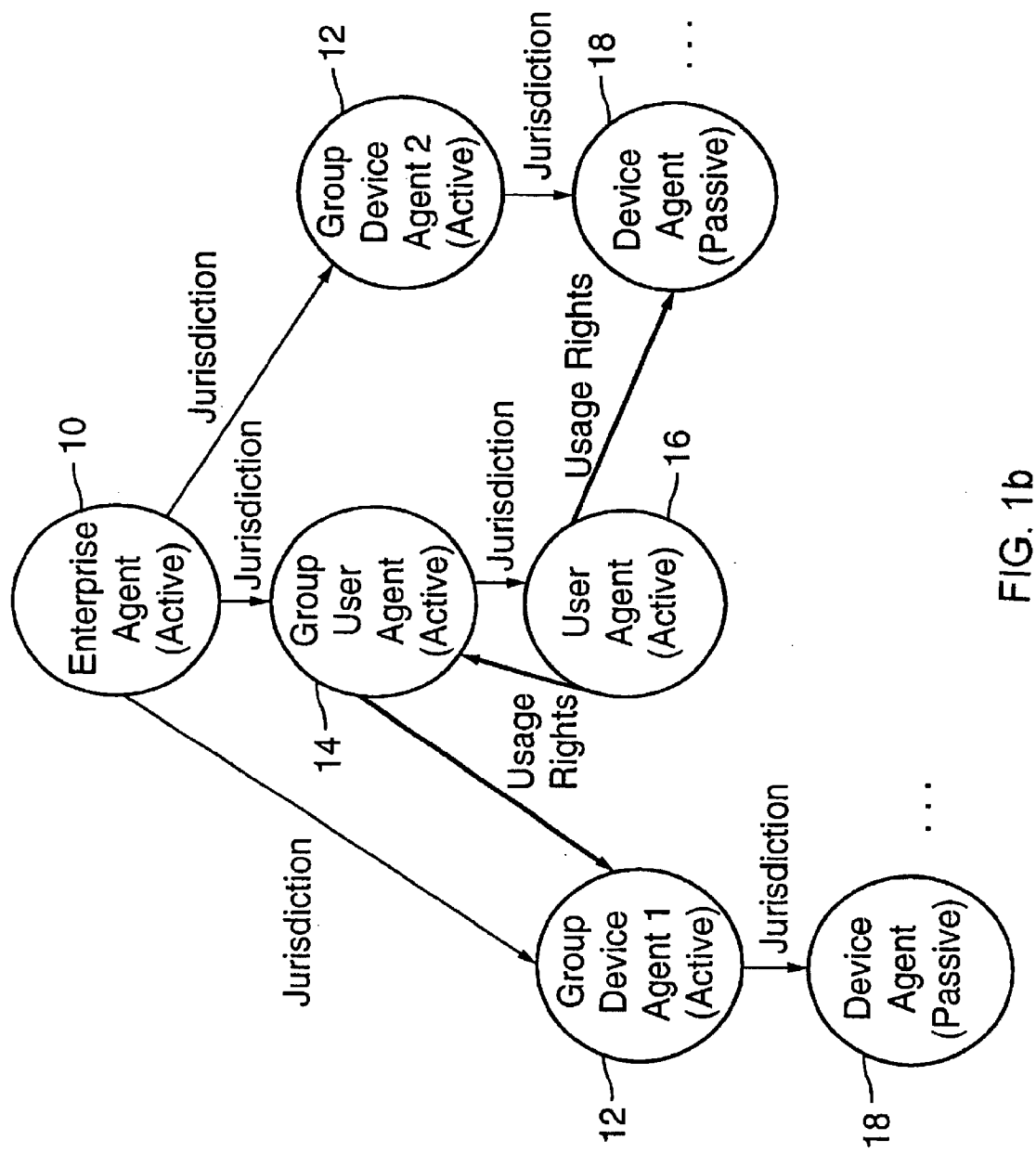
FIG. 1b is a relationship diagram of various agents.

FIG. 1b illustrates a logical view of agent to agent communication used in the present invention. Jurisdiction is shown by a solid line arrow and usage rights is shown by a broken line arrow. An enterprise agent has jurisdiction over all the other agents below it in hierarchy, e.g. group device agents 12, group user agents 14, etc. Similarly, the group user agent has jurisdiction over the user agents 16 below it, the group device agents have jurisdiction over the device agents 18 below them, etc. The group user agent 14 has usage rights over a portion of the service provided by group device agent 1 (12). The user agent 16 has usage rights over a portion of services provided by the device controlled by the device agent under group device agent 2 (12).

Two types of goals can be presented to an agent: acting goals and setting goals. An acting goal is a request for a particular service which uses resources immediately. A setting goal is a request to setup a resource for use later by an acting goal.

Figure 1C:
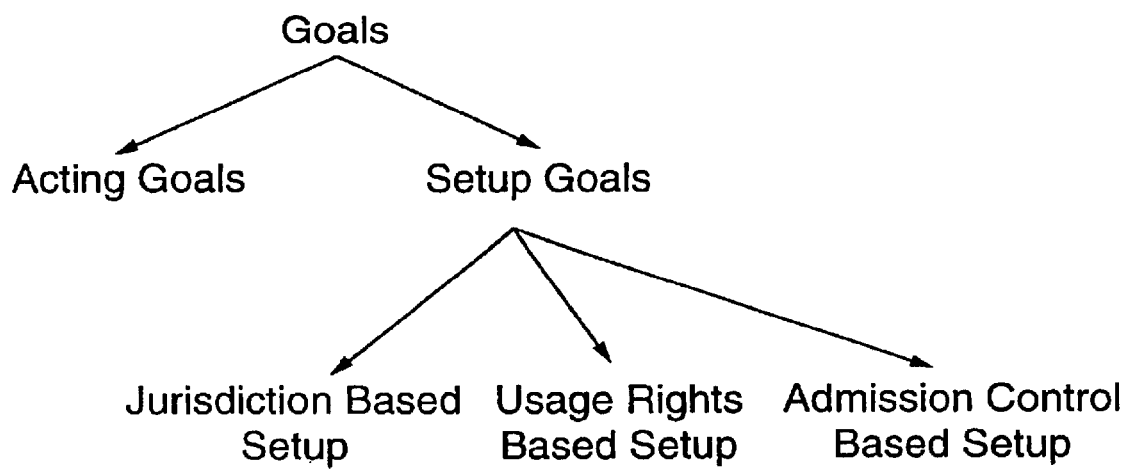
FIG. 1c is an illustration of a hierarchy of goals.

In accordance with the preferred embodiment, as shown in FIG. 1c there are three types of setting goals: (a) goals based on jurisdiction, which tell an agent what goals it can provide, the methods for accomplishing those goals, and the usage rights on resources it needs to provide the goals, (b) goals based on usage rights, where customization is done on a resource over which the agent has usage rights, and (c) a goal for admission control, whereby it causes resources to be reserved, and grants usage rights to other agents for resources.

Figure 1D:
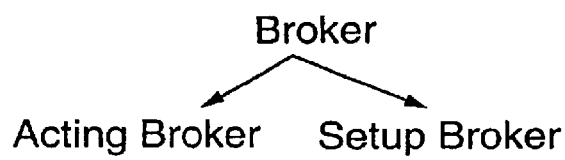
FIG. 1d illustrates different kinds of brokers.

With reference to FIG. 1d, there are different types of brokers which reside in the resource area of an agent. An acting broker acts on a request of an acting goal, for immediate use of a resource. A setup broker satisfies all three types of setup goals, for example by sending any one of, or all of the three types of setup goals to other agents.

Brokers can select among resources the agent has usage rights over in order to better accomplish a goal, or can grant usage rights to another agent, or can setup goals and usage rights for its agent, or can customize resources which the agent has usage rights over.

With reference again to FIG. 1b, there are two different kinds of agents; active and passive. An active agent can accept acting goals which require resources which are accessed by other agents. A passive agent can only accept acting goals which can be accomplished without requiring resources from another agent. A passive agent is an atomic agent, typically representing a single device or a unit (group) of data.

Agents can be specialized for different types of work.

For example, an enterprise agent represents the needs and wants of an enterprise. It could invoke company-wide restrictions on resources, and could be the keeper of the agent directory which has the knowledge of all agent addresses.

A group user agent could represent a group of people which have been assigned a task to perform. A user agent could represent a single person.

A group device agent could be the initiator, or configurator, or creator of device agents for a particular device type.

These agents are all active agents.

A device agent could represent data, or a task that a person can perform, or a physical device including the actions of the device as well as setup information. This is a passive agent.

Other agents, for example, could be billing agents, policing agents, mobility managers, security (anti-hacker) agents, maintenance agents, traffic analysis agents, event tracking agents, etc.

Agents may have different means of allocating resources and decomposing goals, depending on their environment. This can be done to simplify the agent and speed up implementation and provisioning of services. Congestion control procedures can be implemented if there is knowledge of the type of coupling between systems. Tight coupling occurs when two agents know of each other's resources and locations. Policy coupling occurs when there is no real knowledge of the internal operation of another agent. Resource allocation is done dynamically on a policy basis. Contract coupling occurs when there is no real knowledge of the internal operation of the resource. Resource allocation is static, and can only be changed on a contractual basis. Congestion control must be done on a protocol decoupled basis. Information areas may not be used.

Figure 2B:
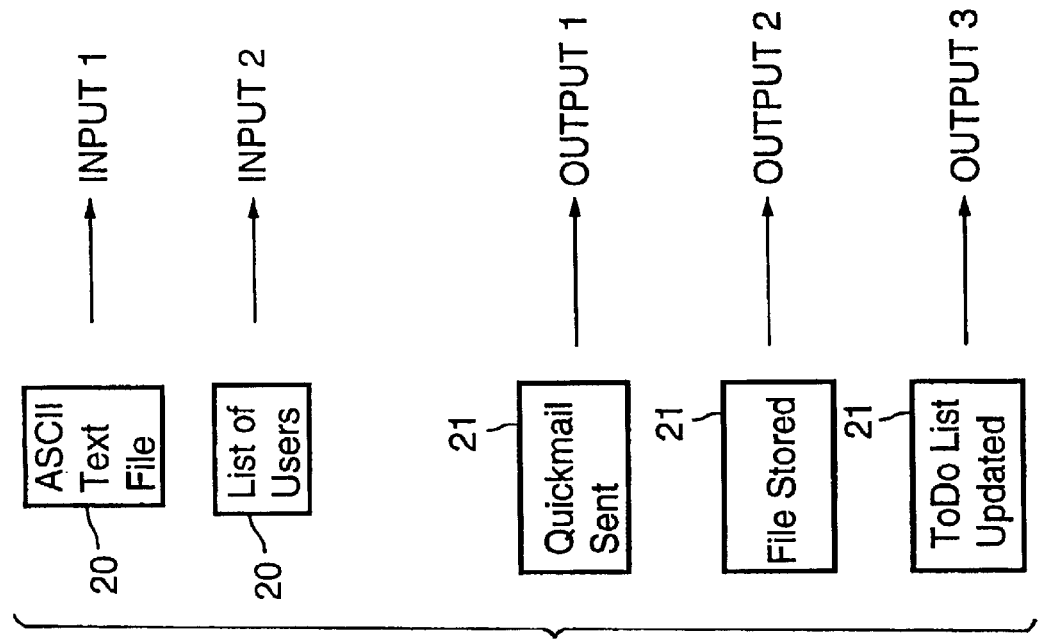
FIG. 2b is an illustration of an example process carried out by an agent.
Figure 2A:
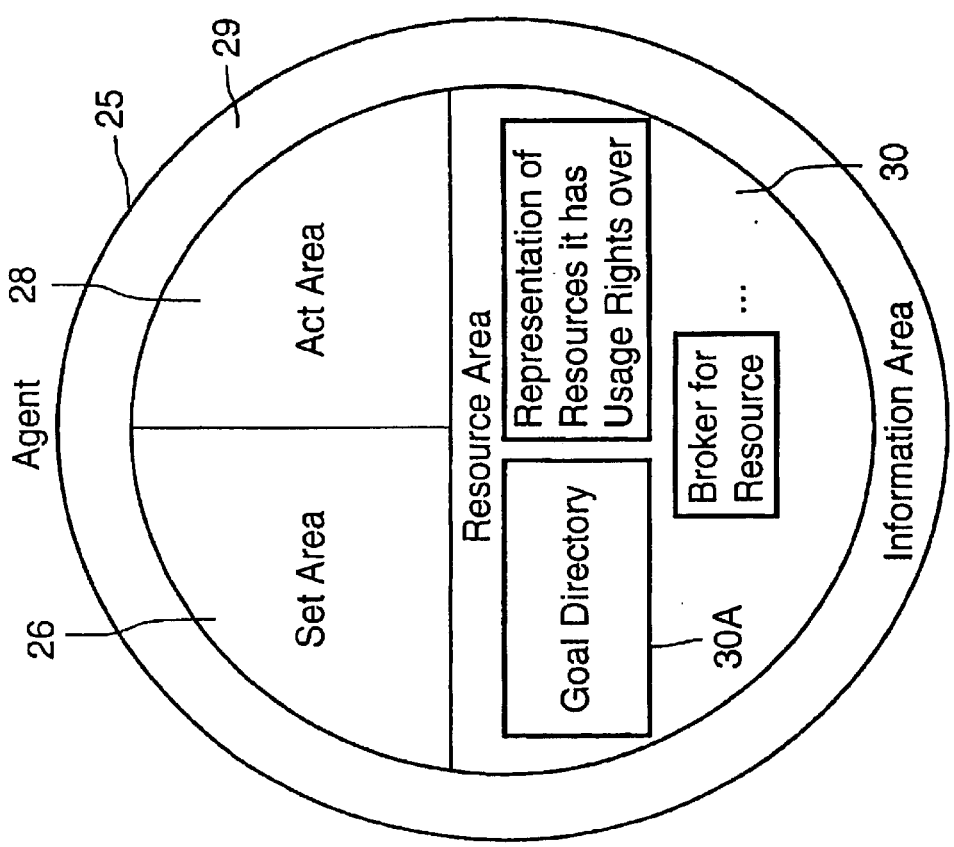
FIG. 2a is a diagram illustrating the general structure of an agent.

The structure of an agent 25 is shown in general in FIG. 2a. The agent is categorized into four parts: an information area 29, a set area 26, an act area 28, and a resource area 30.

The information area 29 represents an area to which the agent posts information about its resources. Any agent which has usage rights over resources, or portions of resources in this agent, has read privileges for this area, if it can gain access to it. Access can be by direct read or be message based.

The set area 26 represents the ability of an agent to accept setup goals of all three types. In a passive agent, it can only accept goals in its goal directory which do not decompose into goals for other agents. When a setting goal is received and decomposes into a unit which represents a resource over which it has usage rights, then it is possible for a feature interaction to occur, and it should be checked for and dealt with here.

The act area 28 represents the ability of an agent to accept an acting goal and to decompose it into other goals which it passes on to other agents, or into resources to which it has usage rights. In a passive agent, goals can only decompose into resources that require no other agent interactions. When it decomposes into a unit which represents a resource over which it has usage rights, then it is possible that a feature interaction can occur, and must be checked for and dealt with here, when that resource is used. The responsibility for the execution of the steps that need to be followed once a goal is decomposed is in this area. This may involve reactive planning. An agent can only act on goals of which it has knowledge.

The resource area 30 represents the data and knowledge sources needed by the agent to decompose a goal. It is private to the agent. A goal directory 30A breaks goals down into their constituent parts, is written to and from the set area 26, and is used from the act area 28. The representation of the resources including basic function, capacity, constraints, bidding mechanism, etc., is also contained in this area, as well as the knowledge source needed to utilize a resource. This can also be written from the set area 26, and used from the act area 28.

In order to setup a system of processes, with agents that have no knowledge of other agents and what resources they use, or how they use them, the initial setup of the system defines the processes, decomposes them into goals for various agents, and the resources needed to accomplish each goal. In a preferred embodiment of the invention, this is accomplished by a system which defines in databases the enterprise in terms of the organizational structure, including the users, the devices and the resources that they use. The processes that need to be done should be described, including the users, groups and resources needed to accomplish each part of them, and in what order. Once the databases are complete, they are decomposed into the goals and resources needed in each agent, and the agents are downloaded with this data. A process is defined as a series of goals, which need resources, and these goals are performed in a predetermined pattern. Thus it may be seen that a telephone call constitutes a process, a request to print data is a process, and an order to purchase equipment is a process of the enterprise.

Simple messages can be used to accomplish complicated tasks, since it is the interpretation of the messages by the agents which gives the system the ability to adapt and change to needs of the users.

Thus services can be created dynamically by having a process agent, which has the sole task to create and maintain services. In accordance with an embodiment of the invention, entities which request new services of processes post their request to an area of a blackboard. A request could for example come from agent 2 (FIG. 1a), as a dynamic request, or from an enterprise modeling tool which has collected via static input, a process that needs to be added to the system. This spawns a process agent 5 which is responsible for attempting to meet the requested process.

The requested process is described in terms of a group of inputs and desired outputs. The process agent has access to a database, in one embodiment, having a digit-tree-like structure made up of pointers to existing agents which can handle various tasks. The process agent reads and interprets this data in order to determine which agents are required to realize the requested process.

The process agent then negotiates the usage rights with each of the various agents involved in creating the new process necessary to perform the new requested process.

The new process agent decides whether or not to install itself in the database of existing processes, in order to become accessible to other agents wanting the same process. The new process agent could also provide itself to the requesting agent, and eliminate itself otherwise.

An example of operation of the above will now be described, with reference to FIG. 2b. A user would like to create a new process to handle monthly reports. On finishing the report, the user would like it to be automatically stored in a memory, mailed to a specific mailing list, and have a "to do" list updated. We will assume that there already exists an agent which handles the sending of ASCII text files to a given user (e.g. a process agent which takes the ASCII file, and sends it to an agent which converts it to a correct format, and then sends it to an agent which does the actual sending). We assume that there also already exists an agent which is responsible for storing files, and another agent which handles "to do" lists of users.

The request of the user is posted to a blackboard, a new process agent is created and given expected inputs from input agents 20 and expected outputs of output agents 21. The new process agent then negotiates usage rights with the existing agents 20 and 21, and puts a procedure together which is comprised of sending a goal to the correct ASCII to Quickmail agent, for each member on the list of users provided, and then sends the file to a storage agent, and makes an update list request to the user's "to do" list agent.

This of course could become an iterative process, wherein the process agent may need to invoke another process agent.

Figure 3A:
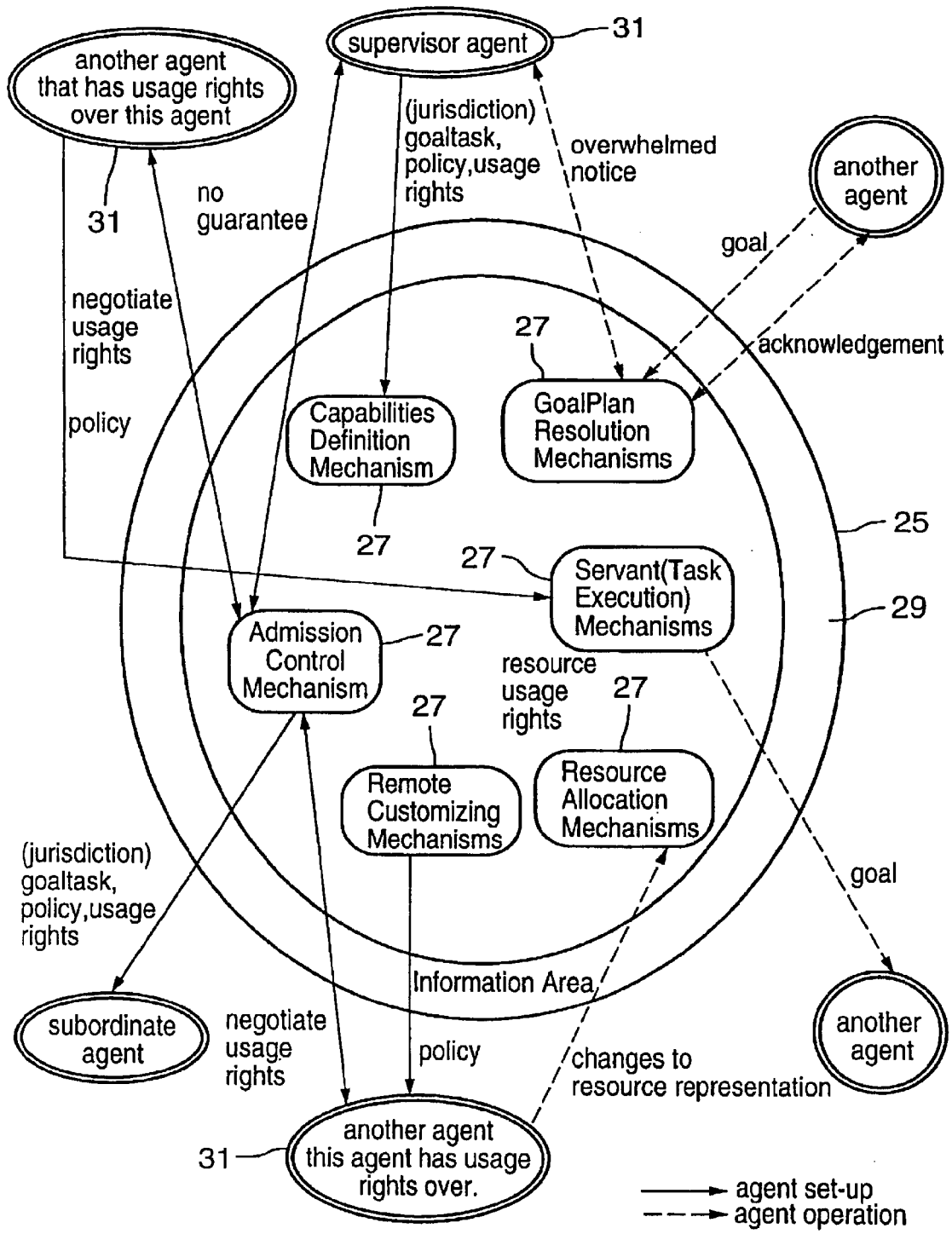
FIG. 3a illustrates a block diagram of an agent.

FIG. 3a illustrates an agent 25 in accordance with a preferred embodiment of the invention, and how it communicates with other agents. The solid arrows illustrate communication links during setup, and the dashed line arrows illustrate communication links during operation.

The agent 25 is comprised of various routines 27 and data 29, all of which is of course stored in memory. The data 29 is generally referred to as an information area. Routines 27 shown in FIG. 3a are servant (task execution) mechanisms, goal or plan resolution mechanisms, capabilities definition mechanisms, admission control mechanisms, remote customizing mechanisms, and resource allocation mechanisms. Links are shown to external (other) agents 31, such as a supervisory agent, a subordinate agent, another agent that has usage rights over agent 25, another agent over which this agent has usage rights, etc.

Figure 3B:
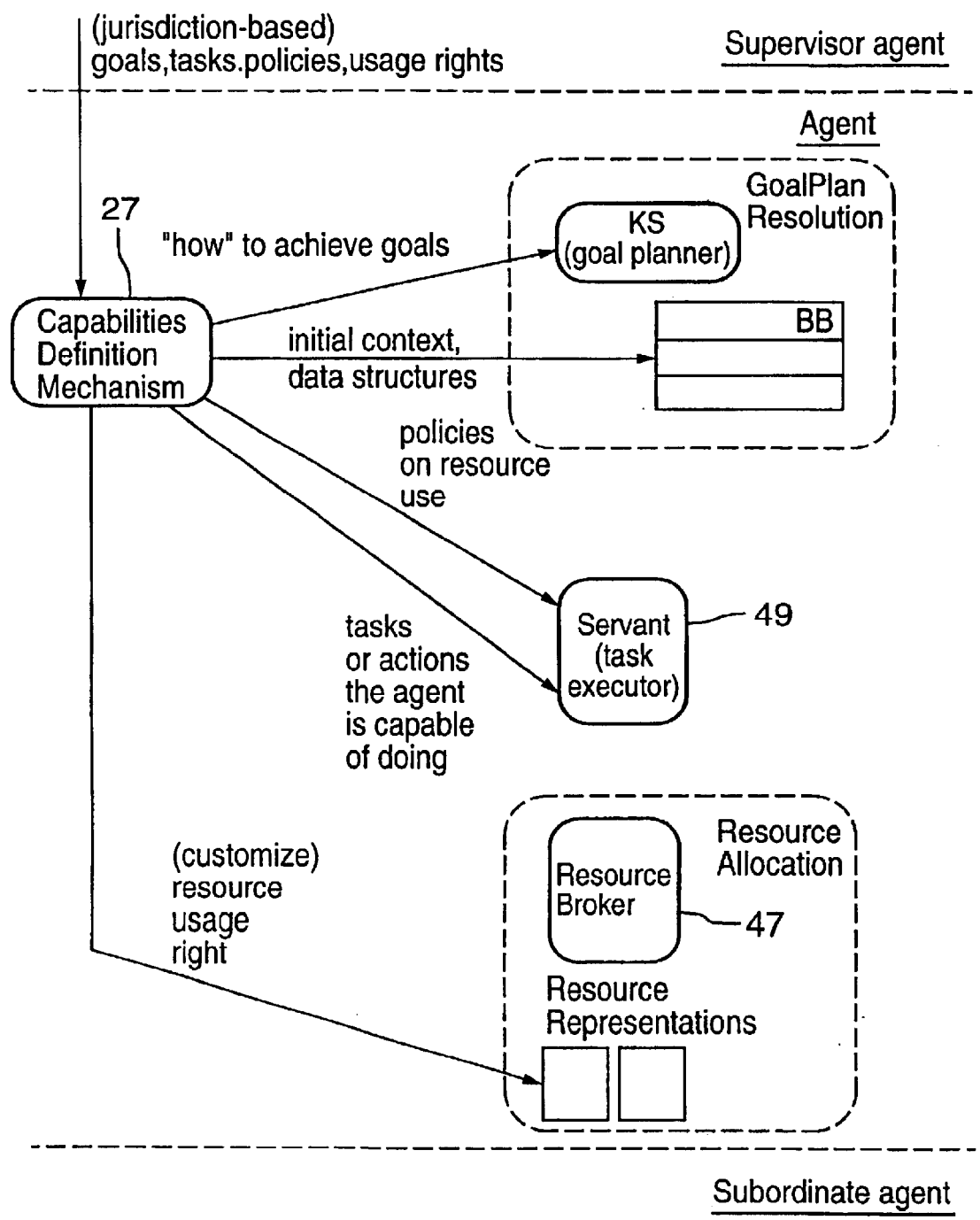
FIGS. 3b, 3c and 3d illustrate the functions of routines of an agent.
Figure 3C:
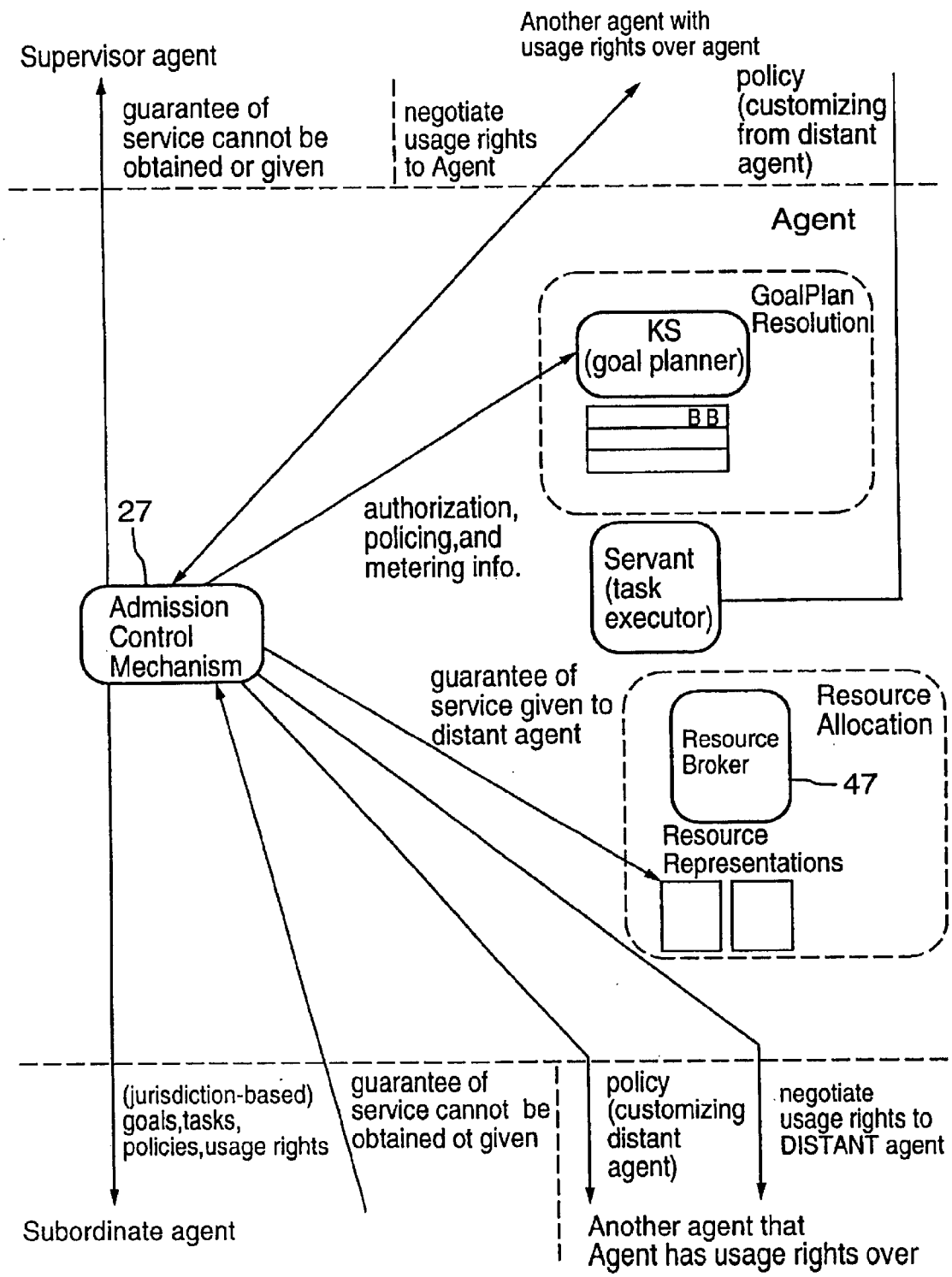
Figure 3D:
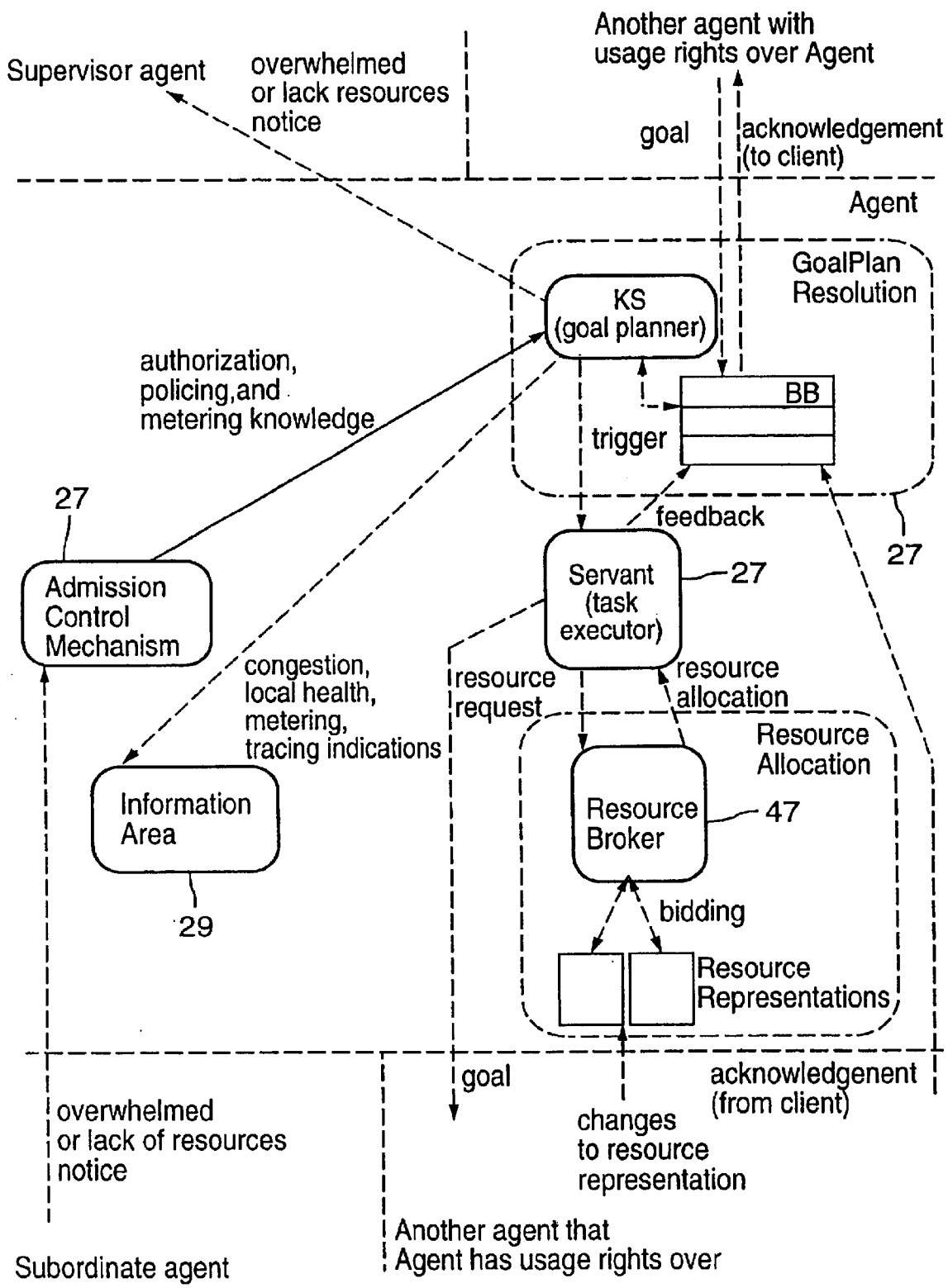

The various routines have functions as follows, with reference to FIGS. 3b and 3c.

The capability definition mechanism receives goals, tasks, policies and usage rights from an agent which has jurisdiction over this agent, i.e. from a higher level agent. It creates knowledge sources and updates the blackboard structure in the act area (28, FIG. 2a). It will also "know" how goals may be satisfied. It will also place servant objects that can execute the possible tasks that will satisfy the different goals in the task executor 49. Representations are placed in a resource broker area 47 (representations of usage rights for resources in order to satisfy goals). This mechanism can add resources in excess of that provided by the group agent to locally customize; the local manager can "purchase" resources independent of the enterprise. It can also customize policies for the broker area.

The admission control mechanism 27 provides usage rights of this agent to other agents; it also provides performance guarantees to other agents. It contains methods for prediction of capacity and performance for the resources, including subsidiary agents, that it controls. The admission control provides authorization and policing information to the act area (28, in FIG. 2a). It contains a method to create lower level agents and to provide these agents with usage rights (goals and resources). The data contained in this area is comprised of the capacity and capability of the agent.

The admission control mechanism also acts to maintain lower level agents in existence, or respond to keep alive messages from upper level agents, which may be done by reading distant information areas, and by sending messages. It prevents the proliferation of orphan agents which have lost contact with the rest of the system; orphan agents should self-destruct.

The agent can modify policies on resource use in the servant object area of a distant agent, and contains methods for modifying those agents over which it has usage rights. The agent can customize a servant object in a distant agent; for example on the push of a specific button on a telephone, a user agent can customize messages sent as a result.

The goal resolution mechanism area (27 in FIG. 3a) accepts goals which are to be executed, which goals will be analyzed and processed by several entities. These entities can be comprised of goal parsing, process, authorization, metering, policing, congestion analysis, resource management, tracing, diagnosis, etc. It is the purpose of the goal resolution mechanism to select the proper action to achieve a goal, given the constraints of the aforenoted entities.

This area functions as an opportunistic reasoner to select an action, given the context of the agent, its resources and the current goals impinging on it. The area could include a blackboard. It interprets/parses an incoming received goal, creates a hypothesis on how to satisfy a goal using a current context, constrains the action of processes which include policing, metering, etc. It can or does also send a goal to the group agent, if overwhelmed by incoming goals, or lacks sufficient resources to realize a goal.

The resource allocation mechanism contains a local representation of resources that the agent has usage rights over, i.e. usage rights information, how much an agent is currently using, and if necessary some information from the information area of the resource agent. This information is comprised of information relevant to the capability of a distant agent to provide the service that it has contracted from. This information from the distant information area can be updated periodically or instantaneously.

If it is not possible to obtain information from the distant information area, the local representation of a resource relies on guarantees supplied by the resource agent a priori. These representations can take part in a bidding process with a broker to supply resources to a servant object, and contain usage rights guarantees and updates the resource has provided a priori to the agent.

The representation contains the address of physical resources, and thus the resource agent can update the representation for reasons of fault congestion, etc. The updating can be triggered by either side dynamically, or periodically. A broker selects resources for a servant object based on policies which have been setup by that servant object.

The servant area 27 (FIG. 3a) contains objects or procedures which can perform the actions upon the goal resolution area. These actions which can be set for a servant object are called tasks. A servant object may be local to an agent, or it may be a pointer to a service provided elsewhere in the system. The servant area may be considered the output of the agent.

This object performs tasks upon receiving trigger messages from the act area. Trigger messages contain the same format of identification and index for identifying the context of the task as the goal message. The object can also feedback the success or failure of the act area relative to the tasks.

The feedback messages can be used to update the context of the act area and thus be used to trigger further action to achieve the goal in that area.

The further action may well be to trigger other servant objects which can further the achievement of the goal. It may be possible for one servant object to trigger another directly to achieve the same purpose. However in general, this is considered less desirable since (a) it prevents the goal resolution area from knowing the full context of the goal and thus prevents it from using its full reasoning capability, and (b) it requires that servant objects have knowledge of each other's capabilities and current states. This harms the independence of these servants and is a task best left to the goal resolution area.

The servant objects should contain policies for the selection of resources by the resource broker. It is important that these policies should be maintained in this area, since they should be able to be customized to the requirements of the local user and also be dependent upon the current actions of the agent.

Upon receiving a trigger message from the act area, a servant object may request more resources from the group agent.

The information area 29 is an area in which the agent can write information which can be used to coordinate its actions with other agents or systems. This can include local system health, congestion indications, metering, tracing, local agent context, and other information pertinent to the activity of the agent.

Information in the information area can be collected by specialized agents and processed to diagnose system problems, congestion, billing, etc. For other agents, the information area is restricted to read only.

Goal and task messages must be flagged with an identification, to indicate the calling agent and the context in which the goal or task is to be interpreted. The message can be comprised of the following format:

(goal)(index)(i.d. of calling agent)(i.d. of agent which is to be acknowledged)

where i.d. represents "identification".

The index is the identification of the process which is being served by the goal, and can be comprised of the following format:

(i.d. of originating agent)(sequence number)

A process is executed by a series of goals and tasks which are passed between agents and servant objects. It is important that the agent be able to authorize, police and meter a goal from a calling agent. In this case the agent can check the identification of the calling agent with the list of goals which it is authorized to set.

The agent typically will be participating in many processes at the same time, and must maintain a context for each of these processes.

The index uniquely identifies each process. Identifications are assigned to an agent by its group agent, which should be arranged hierarchically based on the group agent's identification.

Thus identifications are open ended and are reusable. It is also possible to authorize access based on hierarchical membership in the organization based on analysis of part of the identification.

Figure 4A:
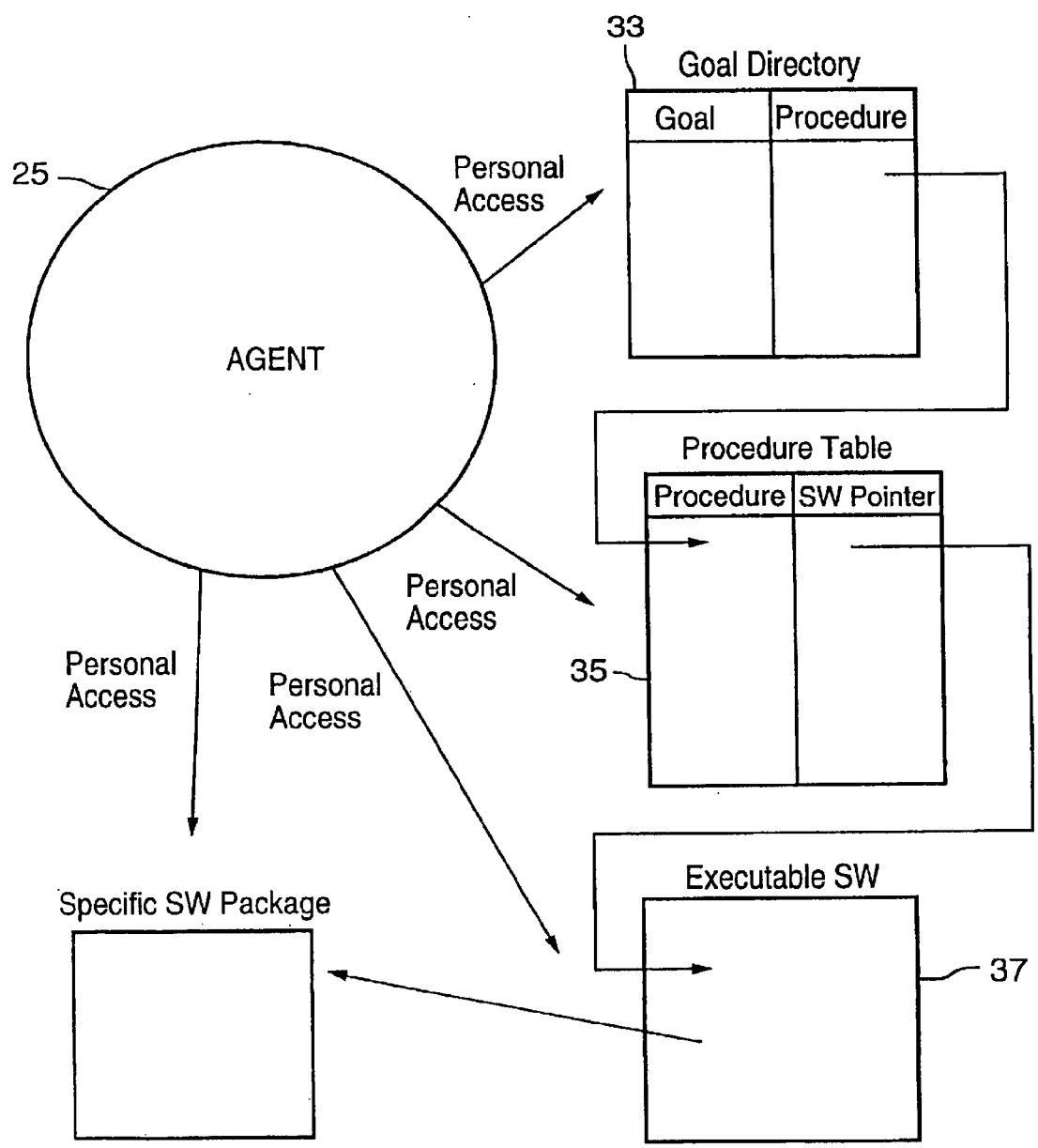
FIG. 4a is a block schematic of a goal resolution mechanism of an agent.

As noted above, agents have goal resolution mechanisms. With reference to FIG. 4*a*, as an alternative to the blackboard type of system, these mechanisms relate to goals, which goals are stored in the information area 29, listed in goal directories 33. Each agent has access to its own goal directory, which contains a list of goals understood by the agent, and a procedure needed to accomplish each goal. Each also has access to its procedure table 35, which, for a given procedure, has a pointer to a software program 37 to run it.

Each of these can be updated or added to by other agents which either have jurisdiction over the agent, or which are granting usage rights for a particular process.

Figure 4B:
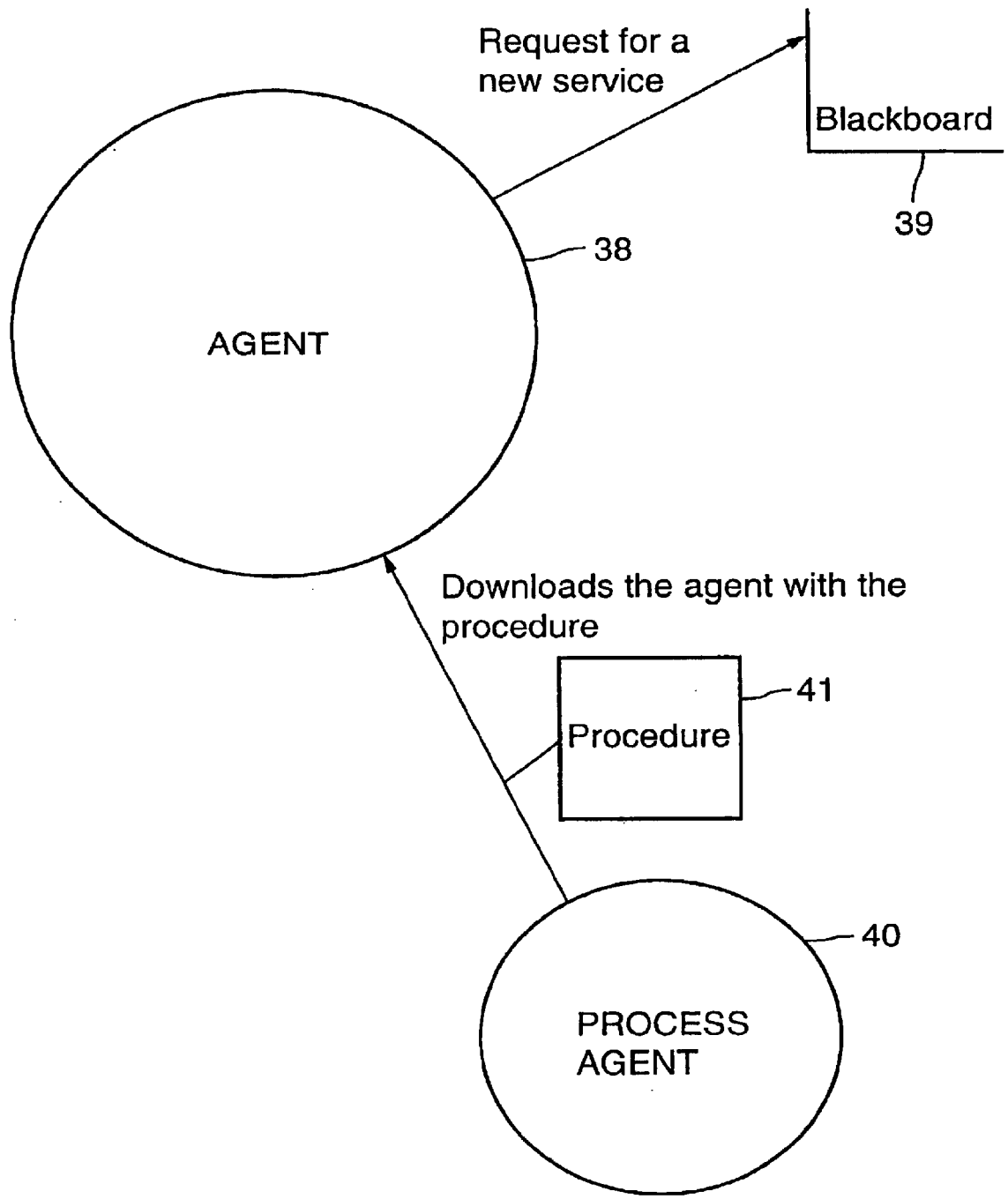
FIGS. 4b to 4d illustrate various processes of creating new agents.

In the case of an agent 38 asking for a new service to be created, as shown in FIG. 4*b* it posts the request to blackboard 40. The successful process agent 39 that is chosen to construct the service creates a new procedure 41 which is downloaded into the agent 38 since he has established and is now granting usage rights over the various components of the procedure.

Figure 4C:
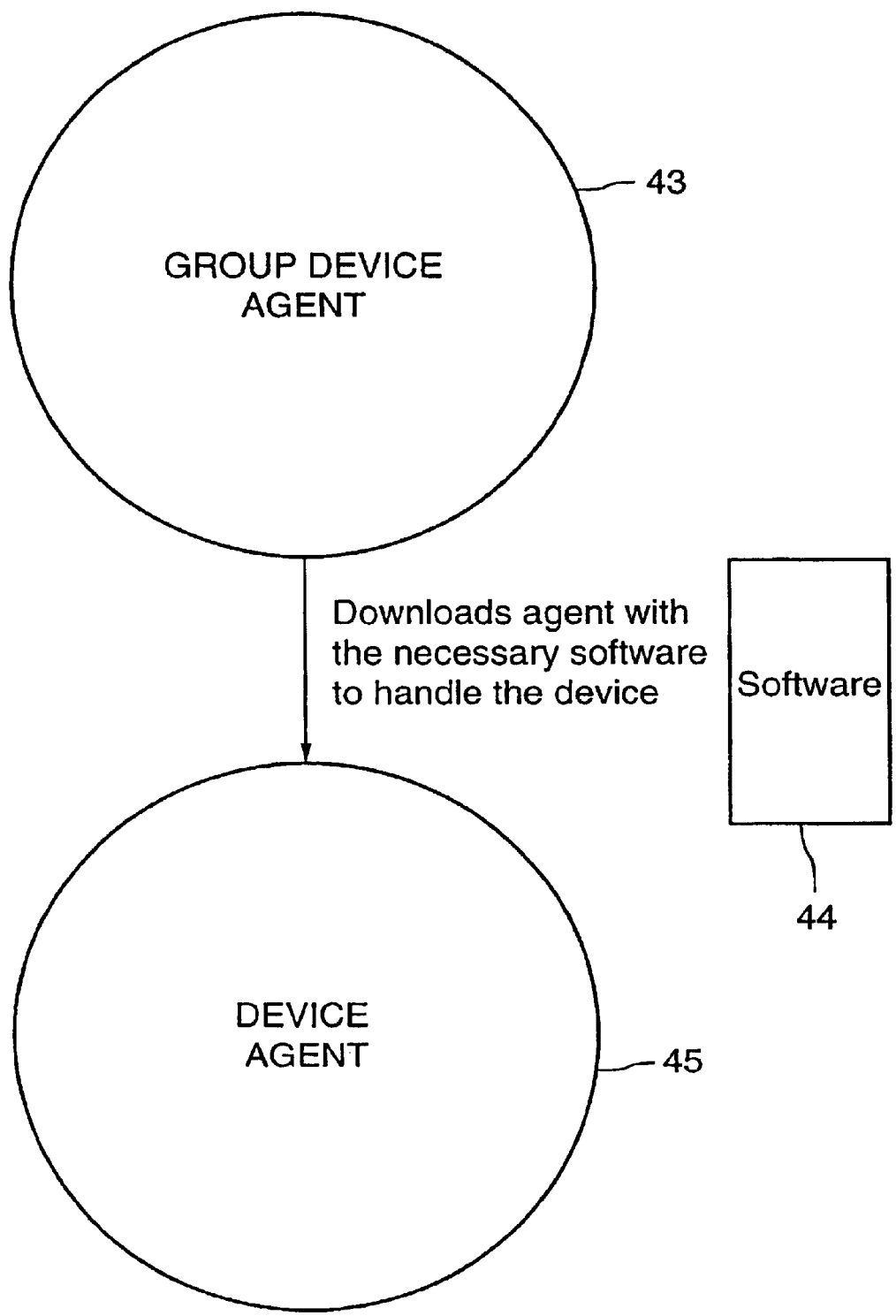

With reference to FIG. 4*c*, in the case in which a group agent 43 wishes to create a new instance of a device agent, it can, through jurisdiction, download the new device agent 45 the necessary software programs 44 to control a device.

Figure 4D:
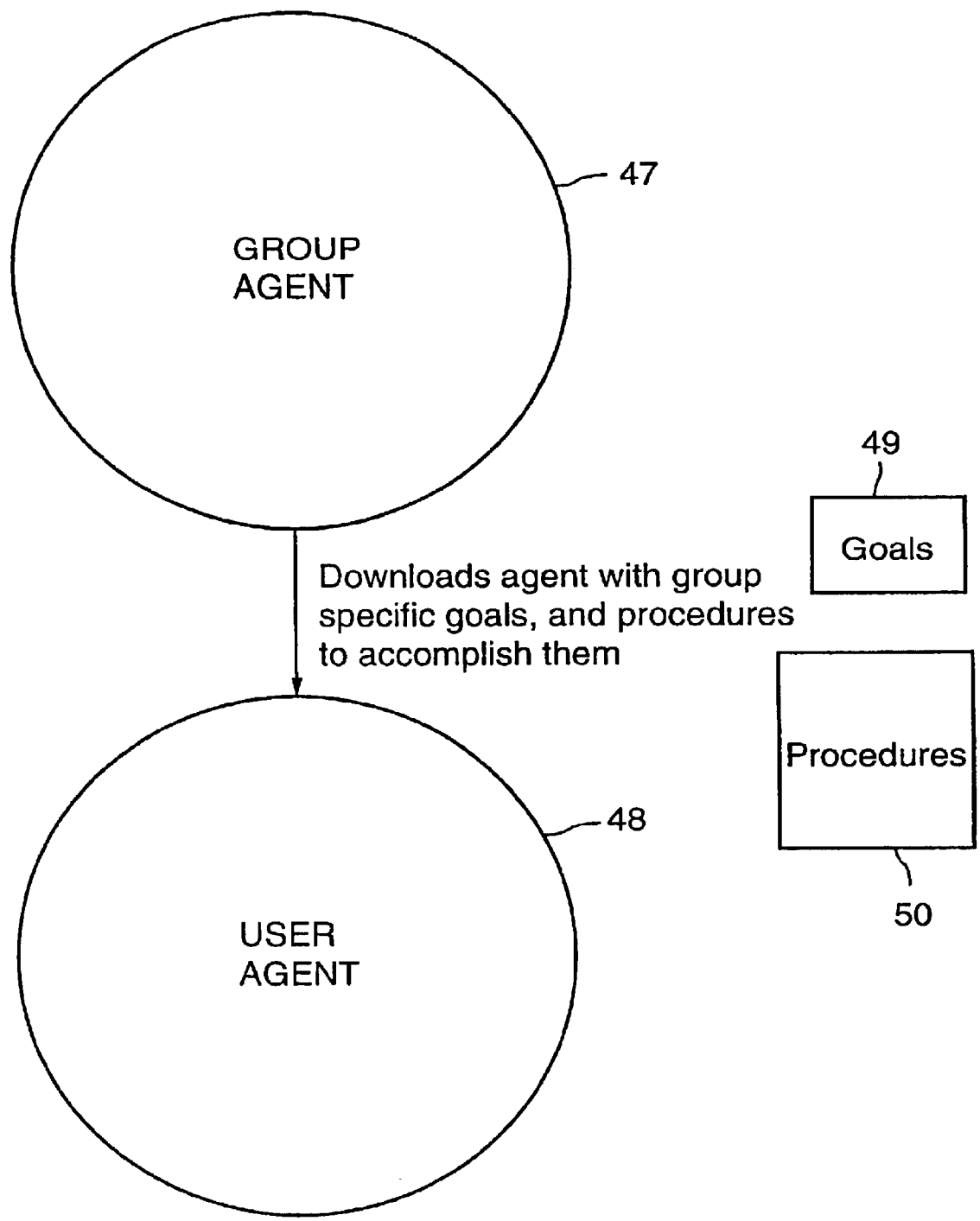

With reference to FIG. 4*d*, in the case in which a group user agent 47 has jurisdiction over a user agent 48, it can endow that user agent with group specific goals 49 and procedures 50 necessary to accomplish them, for the operation of the group over which the group agent 47 has jurisdiction.

Figure 5:
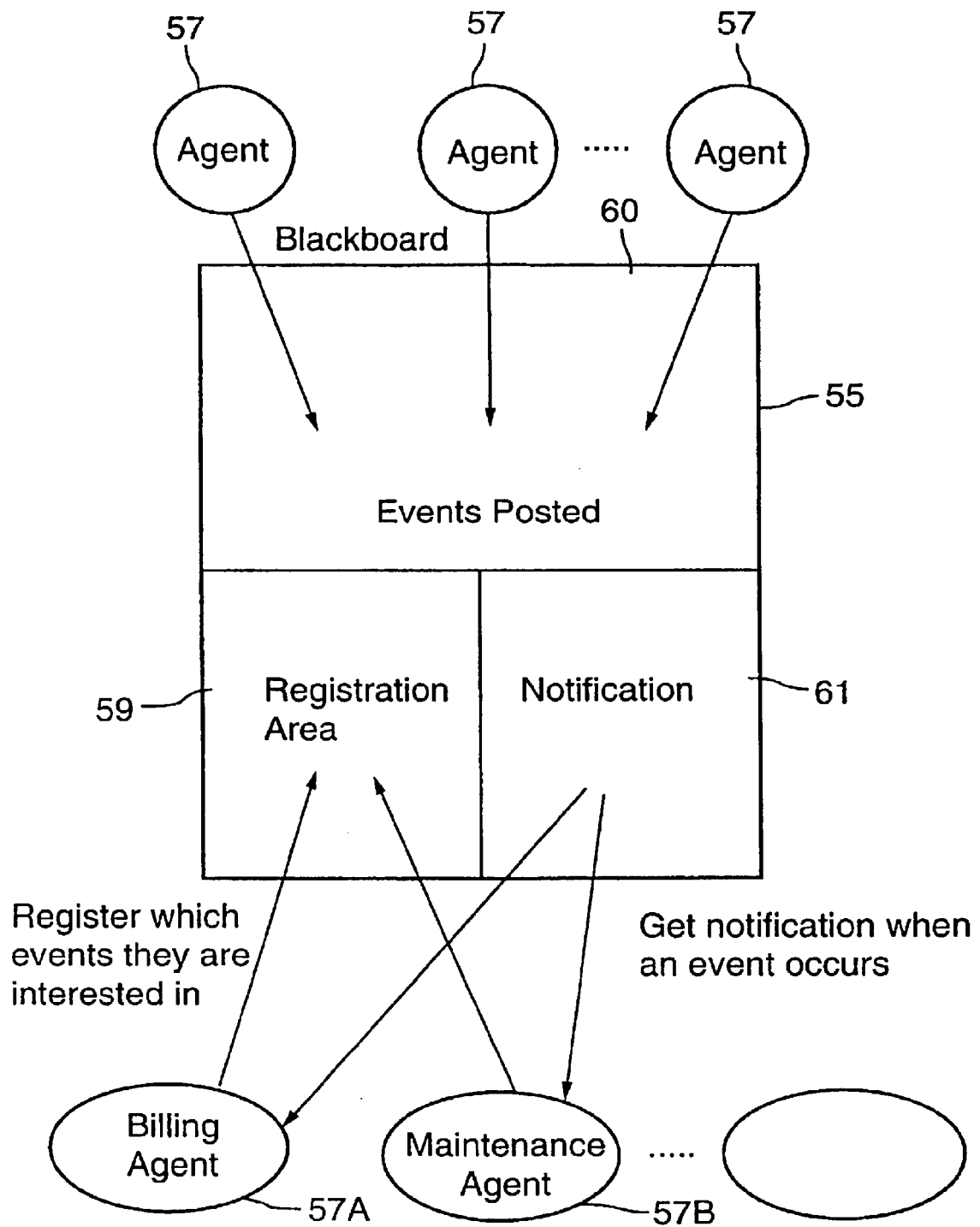

With reference to FIG. 5, when a significant event occurs in an agent, it posts that event to a blackboard 55. Any agent 57 which is interested in a particular event registers that fact in a registration portion 59 of the blackboard 55. When an event occurs, the blackboard is informed, and all interested agents are notified, in a notification area 61 of the blackboard.

Thus for example, if a new billing process is to be added to the system, the concerned agent registers with the blackboard 55 the events it is interested in that may have to do with the billing process. Agents posting any events on the blackboard do not require knowledge that the new billing process agent exists, or where it is physically on the system.

In the system shown in FIG. 5, the example billing agent 57A and the maintenance agent 57B register which events each is interested in, in the registration area 59 of the blackboard. When an event occurs, as posted in the "events posted" area portion 60 of the blackboard 55, if there is data or a procedure that concerns the billing agent or maintenance agent corresponding to the events they have registered that they are interested in, they are notified from the notification area of the blackboard 55.

Neither is it necessary for the entire blackboard be located in one physical location. Each portion of the blackboard could be located in different physical locations, and could be accessible by different processors.

Figure 6A:
FIGS. 6a, 6b and 6c are diagrams used to illustrate pursuance of goals using several agents in different ways

In general, a goal is created and is passed along from agent to agent in the process shown in FIG. 6*a*. The goal and index are constant. However at each stage the identification (i.d.) of the calling agent is changed. This i.d. is used to set the context in which the goal is to be interpreted.

Figure 6B:
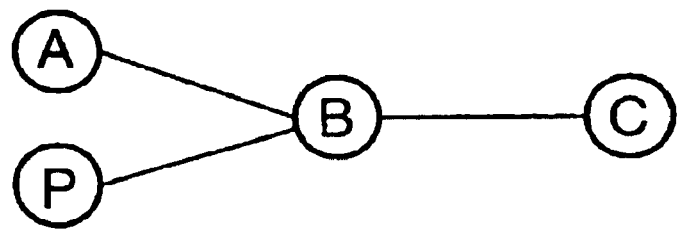

As shown in FIG. 6*b*, agents A and P may have customized agent B to act differently given the same goal. For example, the goal could be the button push on a telephone set. The agent B acts differently on these button pushes after being informed by the telephone agents A and P. Agent A could have set the button push to be a speed dial. Agent P could have customized it to be a line select.

The i.d. of the acknowledging agent in the message indicates to which agent the success or failure of the goal at the current agent is to be acknowledged.

For example, rather then using the process shown in the diagram of FIG. 6a, the agent B may decide to accomplish its goal by invoking other agents, which are unknown to the originator agent A. Thus the process diagram could appear as shown in FIG. 6c.

Figure 6C:
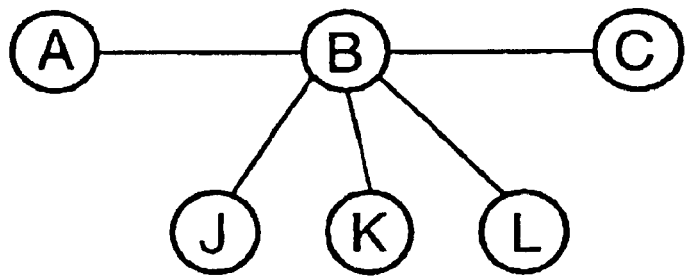

In FIG. 6c, agents J, K and L are under the direction of agent B. If by chance they are unable to achieve their goals, they can acknowledge this to agent B which can take corrective action to clean up side effects of their operation and to further attempt to achieve the goal. Agent B is able to set this up by sending the goal with its own i.d. as the acknowledgment in the message. This allows each stage of the process to be independent of the other stages and to be responsible for their own side effects.

Figure 7:
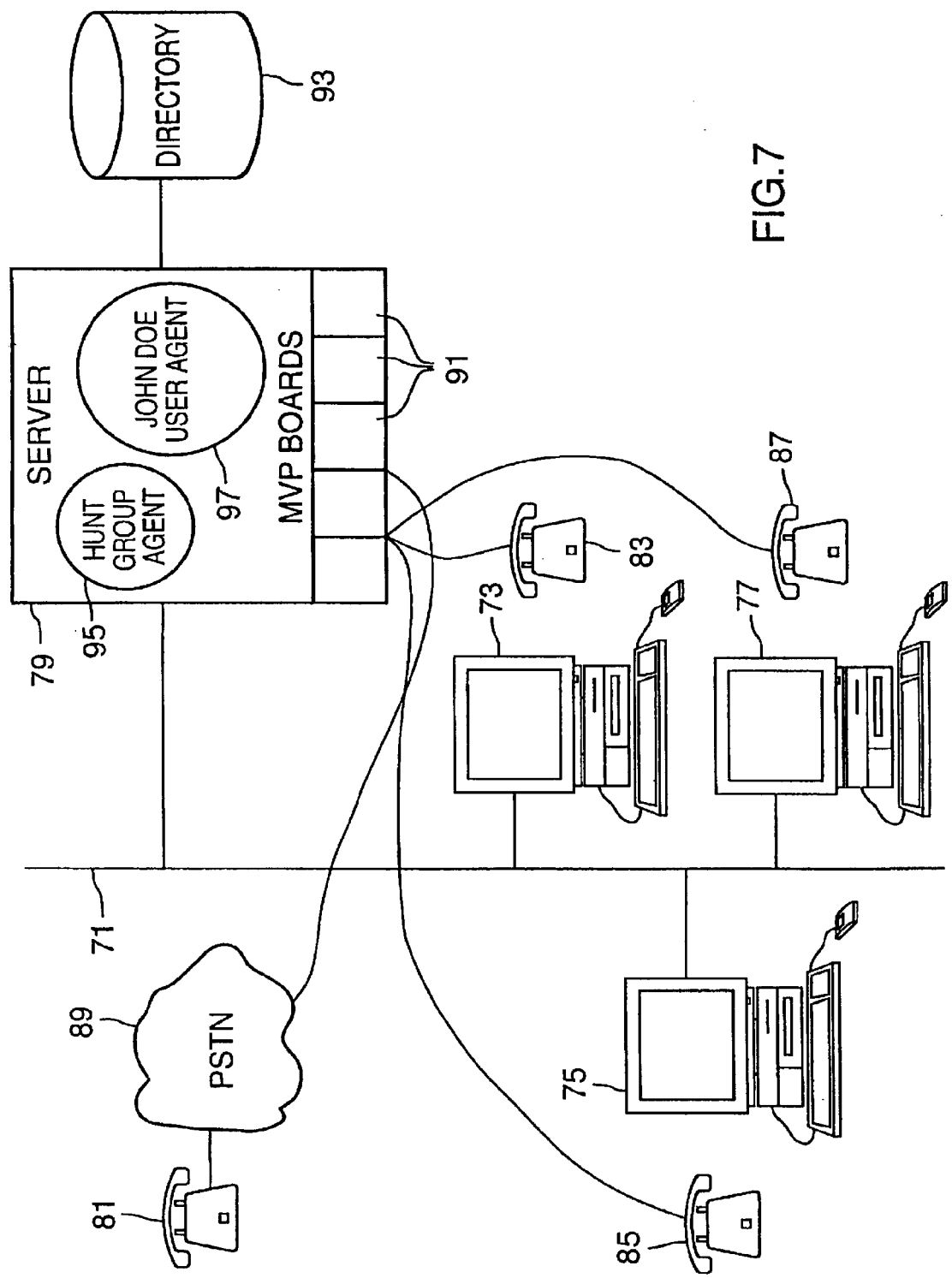
FIG. 7 is a system diagram for implementing the dynamic communication groups according to the present invention.

With reference to FIG. 7, a local area network 71 (e.g. ATM, Ethernet, etc.) is provided having a plurality of personal computers (client PC 73, client PC 75, client PC 77, etc.), and a communications server 79 such as the MediaPath® communication system manufactured by Mitel Corporation. A plurality of local telephones 83, 85, 87, etc., may be interconnected or connected to the external public switched telephone network 89 (and external phone 81) via a plurality of MVIP cards 91, as described in commonly owned U.S. Pat. No. 5,631,954.

According to the invention, a directory database 93 is provided for retaining various data files, such as hunt groups, user data files, role lists, etc., as discussed in greater detail below with reference to FIGS. 9a–d and 10.

Turning momentarily to the prior art hunt group structure shown in FIG. 8, the hunt group is provided with a pilot number (i.e. the number which an external caller at telephone 81 dials through PSTN 89 (e.g. of FIG. 7) to contact a particular hunt group (such as a customer support group), a hunt type (e.g. terminal, circular, longest idle agent, etc.), and the extension numbers (i.e. physical device addresses) of each person who has been programmed to be a member of the hunt group.

As discussed above, when members are added to the hunt group, or when they are removed from the hunt group, or are temporarily away from the hunt group, the hunt group structure must be manually reprogrammed to add or delete the person from each hunt group. Thus, for example, if a person is a member of four hunt groups and that person retires from the organization, then the four hunt groups which that person belonged to must be manually reprogrammed to remove the user's extension number from the member list.

As shown in FIGS. 9a, 9b, 9c and 9d, according to the present invention a new hunt group structure is provided (FIG. 9a), with a pilot number, a name (e.g. customer support), hunt type and feature list. The feature list defines the features that a person who is a member of the particular hunt group (e.g. customer support) can have access to.

Within directory database 93, a role list of all available roles is stored (FIG. 9b) along with the various hunt groups (FIG. 9a) which provides an index to each of the programmed hunt groups. The role list and hunt groups are typically created and maintained by a system administrator.

A user data file is also stored within directory 93, the structure of which is shown in FIG. 9c. The user data file is normally created by a supervisor or by human resources personnel and includes a field for the user's name, telephone number, and a list of roles assigned to the person (from the available roles appearing in the role list (FIG. 9b)), along with additional relevant information which may be required and which is not germane to the present invention.

Figure 9D:
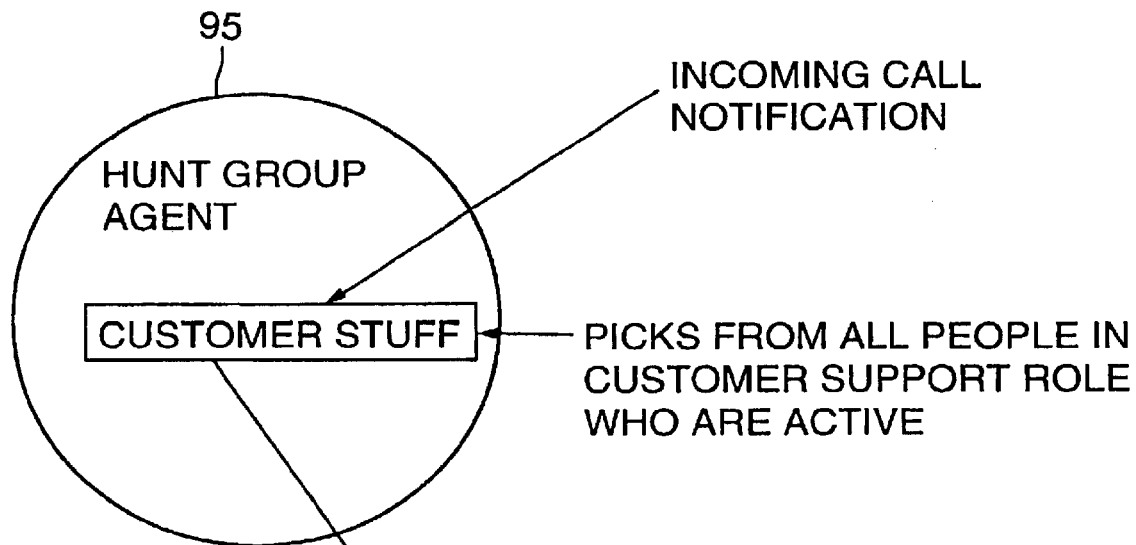
FIG. 9d shows a role status data file structure for the user referred to in FIG. 3c, according to the present invention.

Furthermore, as shown in FIG. 9d, a role status data file is created for each user so that the user may be made active or inactive within a particular role.

Considering FIGS. 9a, 9b, 9c and 9d together, it will be apparent that according to the present invention when a particular person (e.g. John Doe at client PC 77) changes his role within the organization, the particular change need only be made in that person's role list within his user data file (FIG. 9c). Also, as shown in FIG. 9d, the user or user's supervisor (e.g. the person at client PC 75) has the ability to make John Doe active or inactive inside the role (e.g. if John Doe is sick for the day, or gone for lunch, etc.). Making the user "inactive" temporarily removes the person from the indicated hunt group.

Figure 10:
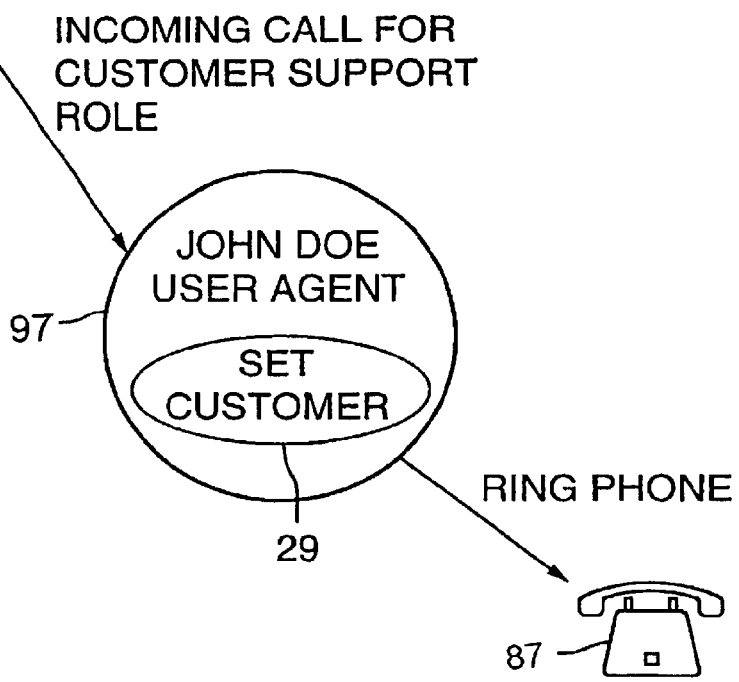
FIG. 10 shows an agent architecture for implementing the dynamic communication groups according to the present invention.

In operation, with reference to FIG. 10, in response to an external call (e.g. from telephone 81 via PSTN 89) to a particular hunt group number (e.g. customer support), a hunt group agent 95 is notified of the incoming call (typically via a trunk agent or other appropriate software agent). In response to receiving the incoming call notification and based on the number dialed, hunt group agent 95 activates the appropriate hunt group (e.g. customer support). Based on the hunt group type (e.g. terminal, circular, etc.), the hunt group agent 95 sends an incoming call notification to the appropriate member of the hunt group according to hunt group type and status of the group. The hunt group agent 95 searches through all of the members who have been defined in the role of customer support, who are currently active and, utilizing the roles defined by the particular hunt group type (e.g. circular, terminal, etc.), and chooses the appropriate person to send the call to. In this case, the incoming call notification is shown directed at the use agent 97 for John Doe.

By offering the call to the user agent 97, the feature set for that hunt group, as defined by the feature list (FIG. 9a) is made available to the user, and causes the user's phone 87 to ring. According to the invention, the role that the call is being offered to can also be identified (e.g. the user's telephone 87 can be provided with the display which indicates "customer support call" etc.).

The hunt group agent 95 and user agent 97 are implemented utilizing an applicant's agent architecture as set forth above in FIGS. 1–6.

Although the examples discussed above with reference to FIGS. 9 and 10 relate to hunt groups, the principles of the invention apply equally to any type of group. For example, if a key line group is programmed, then a new role is created for that key line group (FIG. 9b), and each person who has signed that role (i.e. the "roles" field in FIG. 9c) acts as a member of the new group. Each type of group uniquely defines the behavior that is associated with the incoming call as defined by the feature list.

Although the invention has been described in terms of the preferred and several alternate embodiments described herein, those skilled in the art will appreciate other embodiments and modifications which can be made without departing from the sphere and scope of the invention. All such modifications are intended to be included with the scope of the claims appended hereto.

I claim:

1. In a communication network of an organization, a method for at least one automatically assigning, deleting or revising a role of a person with reference to communication groups of the communication network, the method comprising:

assigning group name identifiers to respective communication groups;

associating predetermined roles and respective group phone numbers to the group name identifiers;

generating user data files for respective users of the communication network;

including in each user data file at least one role identifier;

generating a role list data file;

automatically associating respective ones of the users with a predetermined one or more of the communication groups according to the at least one role identifier, wherein the user is at least one of assigned deleted, or the role of the user is revised within the communication group in accord with the status of the at least one role identifier;

associating a plurality of communication agents with the communication groups;

associating a plurality of user agents with one of the users;

adapting the communication agents to receive incoming calls identified by the respective group phone numbers;

accessing the role list data file to identify the respective users associated with the communication groups;

routing the incoming calls to the associated user agents; and modifying said role list data file, to at least one of remove a user from a group, add a user to a group and revise the role of a user in a group.

2. A communication system comprising:

a) a server having call control software executable thereon and a plurality of voice interface circuits operable for voice communication therebetween under control of said call control software;

b) a plurality of communication devices connected to respective ones of said voice interface circuits and associated with respective users, said devices being organized by said server into a plurality of communication groups based on predetermined functional roles; and c) a directory connected to said server for storing (i) a plurality of user data files for said respective users, each user data file including at least one role identifier, and (ii) a role list data for automatically associating respective ones of said users with a predetermined one or more of said communication groups according to said at least one role identifier;

wherein the role list data file is independent from the plurality of user files and automatically associates each of said respective users with one or more of said communications groups according to said at least one role identifier in a corresponding user's data file of said plurality of user data files.

3. The communication system of claim 2, wherein at least one of said communications groups is a hunt group.

4. The communication system of claim 2, wherein at least one of said communication groups is a pick-up group.

5. The communication system of claim 2, wherein at least one of said communication groups is a key line group.

6. In a communication network of an organization, a method for at least one automatically assigning, deleting or revising a role of a person with reference to communication groups of the communication network, the method comprising:

assigning group name identifiers to respective communication groups;

associating predetermined roles and respective group phone numbers to the group name identifiers;

generating user data files for respective users of the communication network;

including in each user data file at least one role identifier;

generating a role list data file; and automatically associating respective ones of the users with a predetermined one or more of the communication groups according to the at least one role identifier, wherein the user is at least one of assigned deleted, or the role of the user is revised within the communication group in accord with the status of the at least one role identifier, wherein the role list data file is independent from the plurality of user files and automatically associates each of said respective users with one or more of said communications groups according to said at least one role identifier in a corresponding user's data file of said plurality of user data files.

* * * * *